F. H. KNIGHT.
BABY WALKER.
APPLICATION FILED OCT. 27, 1913.

1,141,123.

Patented June 1, 1915.
3 SHEETS—SHEET 1.

Witnesses
Edythe Knight
G. M. Knight

Inventor
Frank H. Knight
by Wm. H. H. Knight
his Attorney

F. H. KNIGHT.
BABY WALKER.
APPLICATION FILED OCT. 27, 1913.

1,141,123.

Patented June 1, 1915.
3 SHEETS—SHEET 2.

Witnesses
Edythe Knight
G. M. Knight

Inventor
Frank H. Knight
by Wm. H. H. Knight
his Attorney

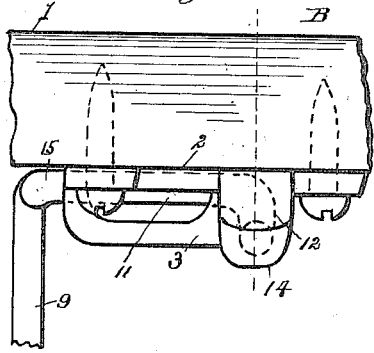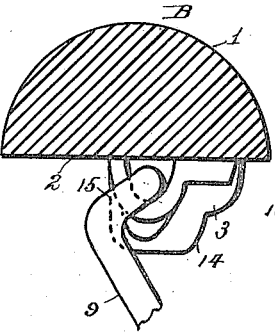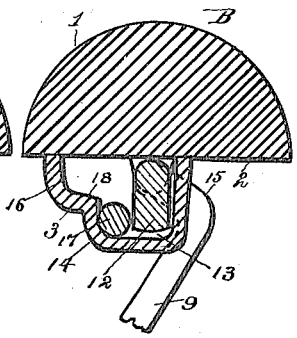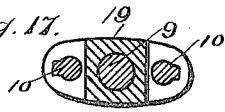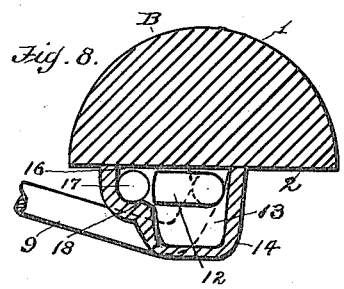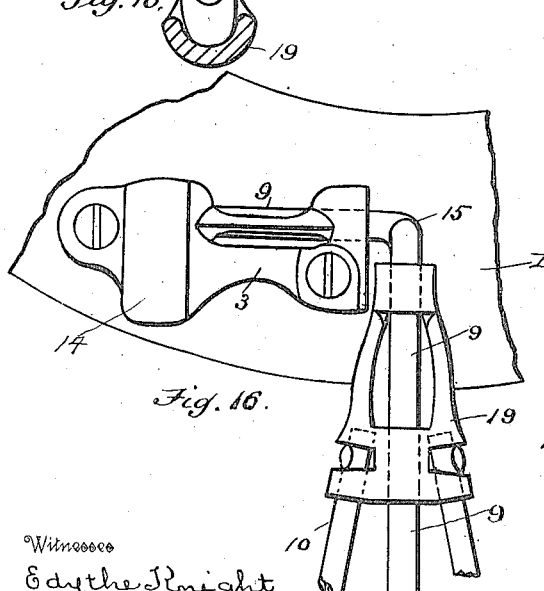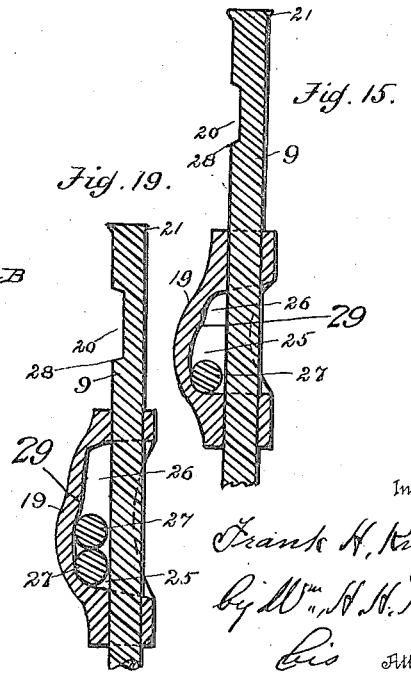

UNITED STATES PATENT OFFICE.

FRANK H. KNIGHT, OF LANCASTER, PENNSYLVANIA, ASSIGNOR TO M. J. KNIGHT, OF LANCASTER, PENNSYLVANIA.

BABY-WALKER.

1,141,123.

Specification of Letters Patent.

Patented June 1, 1915.

Application filed October 27, 1913. Serial No. 297,925.

*To all whom it may concern:*

Be it known that I, FRANK H. KNIGHT, a citizen of the United States, residing at Lancaster, in the county of Lancaster and State of Pennsylvania, have invented certain new and useful Improvements in Baby-Walkers, of which the following is a specification.

The present invention broadly relates to that particular class which comprises devices, of various types constructed, either for the purpose of providing means whereby a child of tender years, may be safeguarded from injury while its parent or guardian is engaged in household, or other duties, or for the purpose of supporting such child during its first attempts to walk, or for the purpose of not only supporting the child as noted, but also of teaching it to both stand alone and to walk, and such invention contemplates the provision of a device of the class named which, commonly known as a baby walker, is designed to afford both safe and comfortable support to a child placed therein for safe keeping during the absence of its parent or guardian; to afford means whereby a child may be kept not only from injuring itself by contact with articles of furniture, by which it might be thrown down, but also from injuring said furniture by overturning the same, or the walls of rooms wherein such furniture is placed; and finally to provide means whereby the child may be taught not only to stand alone but also to walk from place to place.

Figure 1:
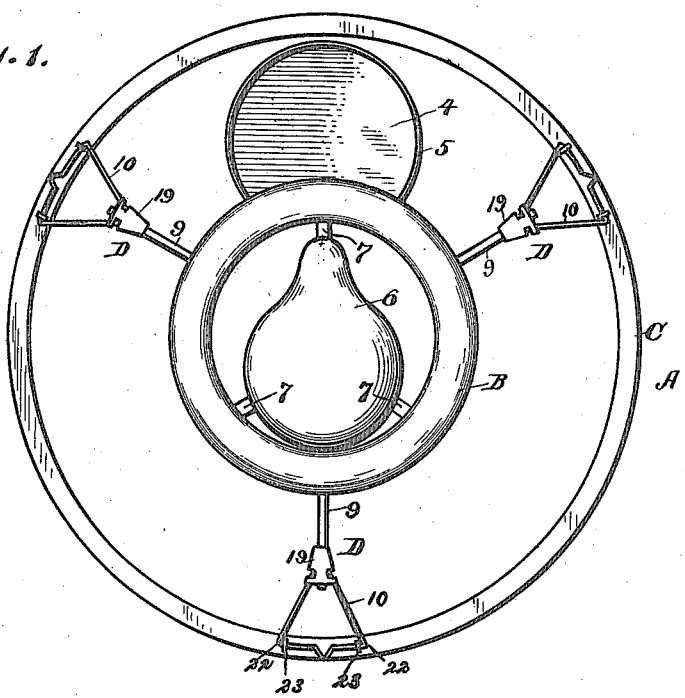
Figure 2:
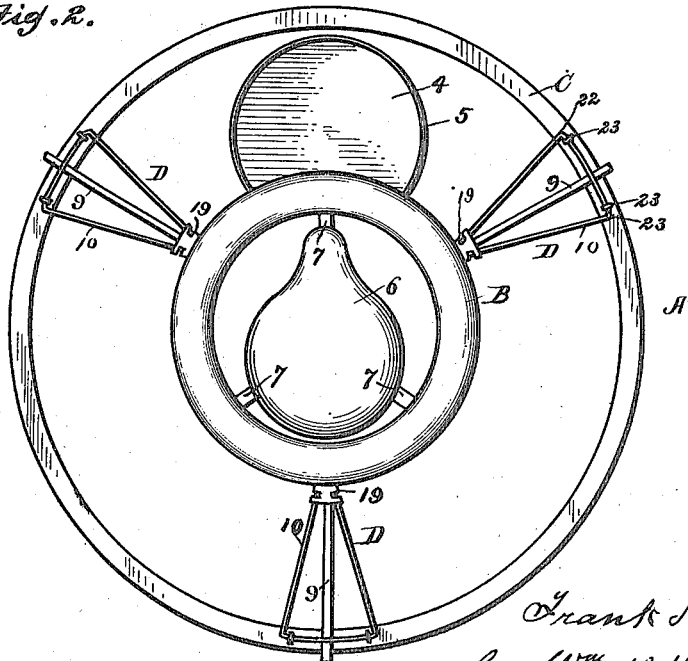
Figure 3:
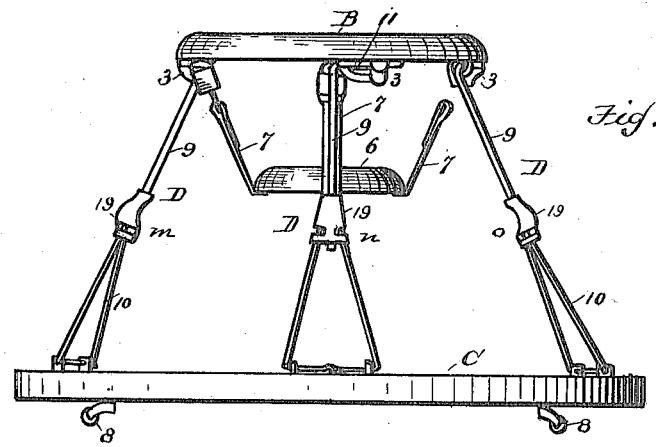
Figure 4:
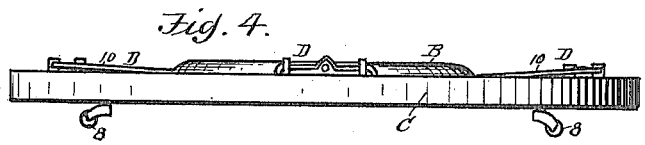
Figure 12:
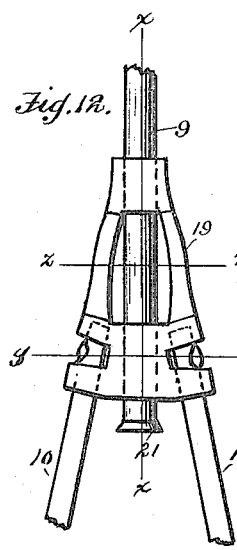
Figure 13:
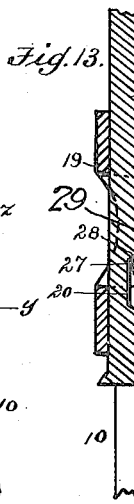
Figure 14:
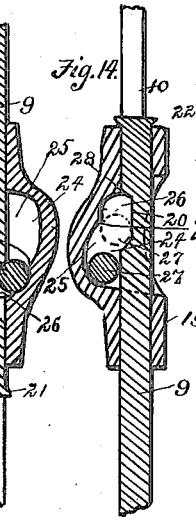
Figure 9:
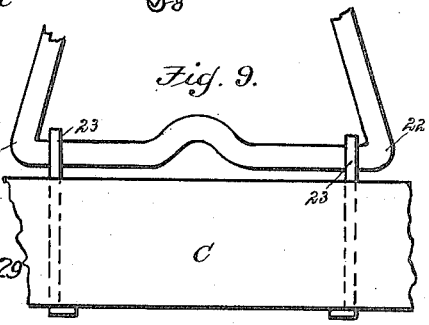
Figure 10:
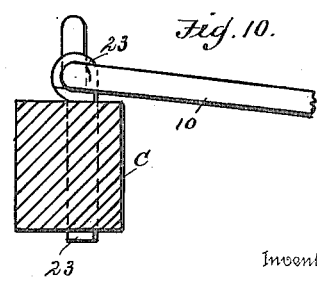
Figure 11:
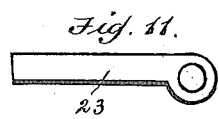

To the accomplishment of the above recited ends the invention consists in the construction, arrangement and combination of the several parts comprised therein, substantially in the manner hereinafter described and illustrated in the accompanying drawings, wherein:

Figure 1, illustrates, in a top plan view, a baby walker, constructed in accordance with my invention, as it appears when open and ready for use. Fig. 2, is a similar top plan view of the walker shown in Fig. 1, showing the same as it appears when closed, or folded together. Fig. 3, represents, in side elevation, the walker open and ready for use. Fig. 4, shows in side elevation the walker as it appears when closed, or folded together. Fig. 5, shows, in an enlarged detail side elevation, a portion of the upper part of the body of the walker, showing the upper hinge which connects the telescoping leg, or support, that extends between the base of the walker and said upper part of the walker body, to said latter named upper part. Figs. 6 to 8, inclusive, illustrate in enlarged detached detail views, the hinge shown in Fig. 5, in different positions. Fig. 9, illustrates in elevation, a portion of the lower end of the telescoping support, or leg which extends between the upper part of the body and the base thereof, showing the manner in which such support is hinged to said base. Figs. 10 and 11, are detached detail views of parts comprised in the lower hinge illustrated in Fig. 9, to show construction of the same. Fig. 12, illustrates in an enlarged detail front elevation the locking device by which the parts comprising the telescoping support or leg, is held in extended locked position. Fig. 13, is a longitudinal sectional view taken on the line $x$, $x$, through the telescoping support shown in Fig. 12, showing said support as it appears when held in extended position and locked ready for use. Fig. 14, is a similar longitudinal sectional view like unto that illustrated in Fig. 13, showing the telescoping support inverted at the moment the parts thereof are unlocked from each other. Fig. 15, is a similar longitudinal sectional view of the parts illustrated in Figs. 13 and 14, showing the said parts inverted as in Fig. 12 and fully unlocked from each other and one thereof, moved endwise with relation to the other for contracting said support $a$. Fig. 16, is a detail plan view of the hinge illustrated in Fig. 5, with a portion of the body of the walker upon which such hinge is mounted, said view showing the relation of the locking device of the telescoping supports, to said hinge, when said support is folded together. Fig. 17, is a transverse sectional view taken on the line $y$, $y$, through the support locking device illustrated in Fig. 12, and looking in the direction indicated by the arrow $a$. Fig. 18, is a similar transverse sectional view through the locking device illustrated in Fig. 12, on the line $z$, $z$, of said Fig. 12. Fig. 19, shows a modified form of locking mechanism for the telescoping connection.

As has been hereinbefore stated the present invention contemplates the provision of a baby walker so constructed as to both safeguard a child of tender years while its parent or guardian is engaged in household, or other duties and also to teach it to stand alone and walk, and while so acting for the welfare of the child, to also safeguard articles of furniture within, as well as the walls and trimmings of the room wherein the device is being so used functions of the utmost importance as will be readily understood.

In addition to those functions, which, as above noted, my invention fulfils for the safety and welfare of the child, and the room wherein the child is held, by such invention certain further functions of importance in this art, may be noted as of special interest, as for instance, the manner in which the device may be collapsed or folded together by simply turning it upside down and without disconnecting any part, or parts thereof, so as to be hung upon a wall, or to be placed in a closet or any desired suitable receptacle and to there occupy but little room when not in use, or in which it may be packed into a package of small size for transportation, without the necessity of dismemberment, as well as for the rapidity and ease with which it may be changed from a collapsed or folded position, as above noted, into position for use, and contrariwise, all of which will be apparent by the construction of the device which construction I will now proceed to describe.

Referring to the drawings wherein similar letters and numerals of reference denote similar parts A, designates a baby walker constructed in accordance with my invention and comprising a ring B, of small diameter which in practice, forms the main support for the child, a ring C, of large diameter which forms the base of the walker, and telescoping connections D, between said upper and lower rings B and C, as shown in Figs. 1, to 3, inclusive which see.

The upper ring B, is preferably formed of wood, and in cross section is preferably made plano-convex, as shown in Figs. 6, to 8, to afford a rounded upper surface 1, upon which the child may lean without injury to itself, and a flat lower surface 2, to receive fitting 3, which form a part of the upper hinge of the supports D, (see Figs. 5 to 8, inclusive,) as will be presently explained.

To the lower plane surface 2, of the ring B, I secure the inner end of a table 4, which, when the baby walker is in position to support a child extends in horizontal direction from the ring B, and is surrounded by a ledge 5, which projects above the upper surface of the table 4, to prevent the fall therefrom of articles placed thereon for the child.

From the lower surface 2, of the ring B, I suspend a seat 6, preferably by flexible supports 7, as shown. I preferably form the lower ring C, of wood, and for the purpose of imparting stability to the walker, I make such ring of large diameter, as compared with the ring B, so the said rings, when the walker is in position for use, shall compare as parts of a truncated cone of like diameters.

To permit the movement of the device from place to place when the child is in position therein, I provide the lower ring with small casters 8, as shown in Figs. 3 and 4.

It is to be understood that the rings B and C, are to be maintained in parallel position both when the device is ready for use, at which time the rings B and C, lie in widely separated planes, as shown in Fig. 3, and when the device has been collapsed to be hung upon a wall, or to be packed for storage or shipment, at which time the rings B and C, lie in the same plane, as shown in Fig. 4. To the ends last above noted I connect the rings B and C, together by telescoping connections, D, and provide such connections, at a convenient point between their opposite ends, with locking devices which operate to hold the members of said telescoping connections at their utmost extension when the walker is in position for use, see Fig. 3, and which also operate to release said members from restraint, when the walker is to be collapsed or folded together as shown in Fig. 4.

The telescoping connections D, consist essentially of two main members 9 and 10, the first named 9 of which has in the main the form of a rod or bar and is provided at its upper end with a laterally projecting portion 11, which extends, in suitable supports in a fitting 3, secured to the lower surface 2, of the upper ring B, as hereinbefore noted.

I provide the free end of the laterally projecting portion 11, of the member 9, with a laterally projecting portion 12, which extends into a chamber 13, formed within an enlargement 14, upon one end of the fitting 3, as shown in Fig. 16.

As shown in Fig. 8, the portion 12, which projects into the chamber 13, noted, extends at a slight angle with the plane in which the body portion of the member 9, (of which it is a part,) extends, this last for the purpose of facilitating the collapsing of the walker, to which end I also provide the upper end of the member 9, near the point at which the laterally projecting portion 11, extends from said member 9, with a bend 15, so that said portion 11, shall extend at an offset with the body of said member 9.

I provide the chamber 13, upon its outer side, with an offset 16, to receive a ball 17, when the device is in folded position, at which time the rings B and C, will lie in approximately the same plane, and the projecting portion 12, of the member 9, will lie parallel with the face 2, of the ring B, the ball 17, being at the free end of said projecting portion all as shown in Fig. 8. When however the device is in position for use, the portion 12, of the member 9, will extend downward in the chamber 13, and the ball 17, will rest between the outer surface of said portion 12, and the wall of chamber 13, below the shoulder 18, therein, all as shown in Fig. 7.

From the last above described position of the several parts, it will be readily apparent that the ball 17, will operate to positively hold the portion 12, from movement while the ring B, and its connected fitting 3, remains in the position shown in Fig. 7, which is the position of the parts noted when the machine is in use.

It will also be apparent that the movement of the parts noted into an inverted, (upside down) position will permit movement of the ball 17, from the locked position shown in Fig. 7, to the unlocked position shown in Fig. 8, which inversion of the device will be noted farther on in this specification.

The member 9, noted, slides freely backward and forward in bearings formed in the opposite ends of a fitting 19, which is rigidly secured to the upper free ends, of the remaining member 10, of the telescoping device, by which the rings B and C, are connected, and such member 9, near its free end, is provided upon one side, with a cut away portion 20, for a purpose presently to be described, and at its extreme end, with slight flanges 21, which prevent it from being wholly withdrawn from the casting, or fitting 19.

The member 10, consists essentially in a single piece of wire, of suitable size, which is bent upon itself at the points 22, to form a broad bearing upon the ring C, see Figs. 3 and 9, and its two arms extend thence in converging planes to the casting or fitting 19, to which they are secured, see Figs. 1 to 3, inclusive. The member 10, is secured to the ring C, by clips 23, which, apertured for the reception of said member 10, extend through the ring C, and are bent at their ends upon the lower surface of said ring, all as shown in Figs. 9, to 11, inclusive.

I provide the fitting 19, which is secured to the member 10, noted, with means for locking the members 9 and 10,—which together form the telescoping connection between the rings B and C,—against movement when said members are in position for use, and to the end named I provide said casting, or fitting 19, with a recessed portion 24, of which a part 25, is of greater depth than the remaining portion 26, for a reason presently to be explained. A downwardly presented internal shoulder 29 of said casting is formed on the dividing line between said deeper portion 25 and said shallower portion 26.

I provide the recess 24, with a ball 27, which is to serve the purpose of a locking device to maintain the members 9 and 10, of the telescoping connection when said members are in position to hold the rings B and C, separated, which position is shown in Fig. 13, in which figure the ball 27, is shown as resting in the shallowest portion 26, of the recess 24, it being then in contact with the under face of the low or shallow shoulder 29 of said casing 19, and also bearing against the inclined lower face of the greater shoulder 28 of the rod-form member 9. In this position, the shoulder 29 prevents the said ball from rising out of the shallow portion 26 of the recess in said casing, and by its contact with shoulder 28 as well as shoulder 29 and the bottom of said shallow portion 26 of the recess in the casing the said ball blocks or wedges the member 9 against being moved downward; and also locks the member 10, carrying casing 19 against being moved upward. In other words, the said ball and the parts with which it is in contact in this position lock the parts 9 and 10 in telescopically extended position, holding the baby-walker ready for use.

When the baby-walker is to be collapsed for convenience of transport or storage, it is inverted so that each member 9 becomes the lower member of the telescopic support and the member 10 becomes the upper member of the same. The ball 28 will then still bear at first against the inclined face of shoulder 28 and be held thereby against shoulder 29 and in shallow part 26 of the recess, said ball being of too great diameter to pass through the interval between shoulders 28 and 29 while they are in this position. To permit the collapsing of the baby-walker it is then necessary to move the inverted member 9 longitudinally upward through the casing 19 sufficiently to let the ball 27 come in contact with the bottom of recess 20 above the incline of inverted shoulder 28, the ball then occupying the position indicated by dotted lines in Fig. 14, and being manifestly free to roll down into the larger part 25 of the recess in casing 19, such passage being made feasible by the fact that the interval between shoulder 29 and the bottom of recess 20 is greater than the interval between shoulder 29 and the inclined face of shoulder 28 hereinbefore referred to. When the ball 27 is in the deeper part 25 of the recess in the casing, as shown by full lines in Fig. 14, the two members 9 and 10 are free to move telescopically as indicated by the comparison of Fig. 15 with Fig. 14, such movement contracting the support. All three of such supports are of course operated in the same way.

In Fig. 19, I have shown a fitting 19, in which a plurality of locking balls are employed, in lieu of a single ball, as shown in Figs. 13 to 15, inclusive.

The operation of my invention will, it is thought, be understood from the foregoing description, it being remembered that simply turning the walker upside down will operate to release both the locking balls 17, of the fitting 3, upon the ring B, and the locking balls 27, of the fitting 19, from locking engagement with the member 9, and thus permit the folding or telescoping of the same, in view of which fact further description of the device, or of its operation, is deemed to be unnecessary herein.

Having thus described my invention I claim and desire to secure by Letters Patent:

1. In a baby walker, a child-supporting member and a base, in combination with two telescopic parts and a shifting intermediate device for supporting said member, one of said parts being provided with an internal chamber consisting of a shallower portion and a deeper portion, also with a downwardly presented shoulder between these two portions of the chamber, and the other telescopic part being provided with a shoulder, said telescopic parts being adapted to be locked by said intermediate device when the latter is in the shallower portion of said chamber and in contact with the shoulder of the other telescopic part, but to be freed for telescopic contraction by inverting the baby walker and loosening the said shifting device so that it may pass into the deeper portion of said chamber.

2. In a baby walker, a child-supporting member and a base, in combination with a telescopic connection supporting said member and comprising a rod or bar provided with a recess and a shoulder, a part provided with a casing having an internal chamber and telescopic connection with said rod or bar and a ball contained in said chamber, the latter consisting of a deeper portion and a shallower portion and the said casing being provided with an internal, downwardly presented shoulder between these two portions, the said telescopic parts being arranged and adapted to be locked by said ball when the latter is in the shallower portion of said chamber and in contact with the shoulder of the other telescopic part, but to be freed for telescopic contraction by inverting the baby walker and allowing the ball to roll into the deeper portion of said chamber.

3. In a baby walker, a child-supporting ring and an annular base, in combination with a series of intervening connections supporting said ring, each of said connections consisting of two telescopic parts provided with a ball and arranged and adapted to be locked by the engagement of said parts with said ball at a certain point of telescopic extension, the inner one of said concentric parts being provided with a shoulder and the other one of said parts being provided with an internal chamber comprising a shallower portion and a deeper portion, also with a downwardly presented shoulder between said portions, the said parts being adapted to be freed for telescopic contraction by inverting the baby walker and causing said ball to roll into said deeper portion of said chamber out of locking contact with the said inner telescopic part.

4. In a baby walker, a child-supporting ring and an annular base, in combination with a series of intervening connections consisting of two telescopic parts pivoted respectively to said ring and said base, and provided with a ball for locking said parts together at a certain point of telescopic extension, one of said parts having a shoulder and the other telescopic part being provided with a chamber divided by a downwardly presented shoulder into a deeper portion and a shallower portion, the former portion being above the latter and the said parts being locked when the ball is in the shallower portion of the chamber and against the shoulder of the first mentioned telescopic part, but the said parts being adapted to be freed by inverting the baby walker and causing the ball to roll into the deeper portion of said casing out of locking contact with the first mentioned telescopic part.

5. In a collapsible baby-walker, a baby-supporting member and a base therefor, in combination with intervening telescopic connections pivotally connected at their ends to said member and base and provided with automatic means for locking the parts of said connections together at a certain point of extension, also with means arranged to simultaneously lock against pivotal motion the parts of said connections attached to said baby-supporting member, all of these locking means being adapted to be automatically left free after the inversion of the baby-walker.

6. In a collapsible baby-walker, a baby-supporting member and a base therefor, in combination with intervening telescopic connections pivoted to said member, means actuated and released by gravity for locking said connections at a certain point of said extension and means for locking said connections against pivotal motion with relation to such member, all the aforesaid means being automatically freed by the inversion of said baby-walker and slight loosening of frictional contact substantially as set forth.

7. In a baby-walker, a baby-supporting ring and an annular base, in combination with a series of intervening telescopic connections pivoted to said parts at both ends, each of said connections including a recessed and shouldered part and a casing loosely surrounding the same to permit relative longitudinal motion, said casing having an interior chamber which is shallower at its lower end and deeper at its upper end, a downwardly presented shoulder dividing the shallower portion of said chamber from the deeper portion thereof and a ball in said chamber, the said parts being adapted to be locked by said ball when the recess in the former part comes opposite the shallower part of the chamber in the casing, permitting the ball to fit into said shallower portion of the chamber and into said recess, also between said shoulders to lock them, said telescopic parts being free for contraction after the baby-walker has been inverted and the ball has run by gravity into the deeper part of said chamber in the casing.

In testimony whereof I hereto affix my signature in presence of two witnesses.

FRANK H. KNIGHT.

Witnesses:
T. ROBERTS APPEL,
JOHN W. APPEL.